3,418,257
CRYSTALLINE ZEOLITE CONTAINING SINGLY
CHARGED NICKEL CATIONS
Karl Robert Müller, Brussels, Belgium, Jule. A. Rabo, Armonk, and Paul H. Kasai, White Plains, N.Y., assignors to Union Carbide Corporation, a corporation of New York
No Drawing. Filed Sept. 2, 1965, Ser. No. 484,736
2 Claims. (Cl. 252—455)

ABSTRACT OF THE DISCLOSURE

Crystalline alumino-silicate zeolites of the molecular sieve type containing cationic nickel ions in the plus one valence state, and process for making them by reducing zeolite Y containing nickel ions in the plus two valence state.

---

This invention relates to crystalline alumino-silicate zeolites of the molecular sieve type. More particularly, the invention is directed to crystalline zeolites comprising derivatives of crystalline zeolite Y in which at least a part of the sodium cations of zeolite Y have been replaced by singly charged nickel cations.

The crystalline zeolites of this invention are unique in that they contain nickel cations in a normally unattainable valence state, that is, nickel cations which are stabilized and can exist indefinitely in the "plus one" valence state.

Crystalline zeolite Y and methods for producing it are described and claimed in U.S. Patent 3,130,007, D. W. Breck, issued Apr. 21, 1964. Crystalline zeolite Y is defined and characterized by its chemical composition and X-ray diffraction pattern. The chemical composition, in terms of mole ratios of oxides, is as follows:

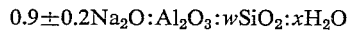

$$0.9 \pm 0.2 Na_2O : Al_2O_3 : wSiO_2 : xH_2O$$

wherein $w$ has a value greater than 3 up to about 6 and $x$ can have a value up to about 9. The X-ray diffraction pattern is set forth in U.S. Patent 3,130,007.

The structure of crystalline zeolite Y can be described as a framework of $SiO_4$ and $AlO_4$ tetrahedra crosslinked by the sharing of oxygen atoms. The (negative) electrovalence of the tetrahedra containing aluminum is balanced by the presence of sodium cations located at various sites adjacent to the aluminosilicate framework. Such charge balancing cations are referred to herein as "zeolite cations." Void spaces in the framework can be occupied by water molecules. The sodium cations can be replaced by other cations to give many "ion-exchanged" derivatives of zeolite Y. Replacement of sodium cations can be easily accomplished by conventional ion-exchange techniques, for example by contacting zeolite Y with an aqueous solution of a salt of the cation to be exchanged for sodium cations.

The compositions of the present invention are derivatives of crystalline zeolite Y in which at least one-tenth of one percent of the sodium cations of zeolite Y have been replaced by singly charged nickel cations. Stated otherwise, the compositions of this invention are crystalline zeolites having the anionic aluminosilicate framework of crystalline zeolite Y and in which at least one-tenth of one percent of the zeolitic cations are singly charged nickel cations. These compositions cannot be prepared by conventional ion exchange methods, because nickel "plus one" cations do not exist in stable form in aqueous or organic solvent solutions.

When the concentration of $Ni^{+1}$ cations in derivatives of zeolite Y is less than about one-tenth of one percent, it becomes relatively difficult to detect the electron spin resonance signal of $Ni^{+1}$. Accordingly, the compositions of this invention are defined as containing at least one-tenth of one percent $Ni^{+1}$ cations, such compositions being readily identifiable by the methods described hereinbelow.

The compositions of this invention can be produced by first preparing a derivative of zeolite Y in which at least two-tenths of one percent of the sodium cations have been replaced by doubly charged nickel cations ($Ni^{+2}$). This can be done by conventional ion exchange methods. The $Ni^{+2}$ cations are then reduced to $Ni^{+1}$ cations.

Suitable derivatives of zeolite Y are not limited to those containing only sodium cations and $Ni^{+2}$ cations. The derivative can be, for example, a calcium derivative containing both $Ca^{+2}$ and $Na^{+1}$ cations which is further ion-exchanged to replace some of the $Ca^{+2}$ ions and some of the $Na^{+1}$ ions with $Ni^{+2}$ ions.

In one suitable reduction method, the $Ni^{+2}$ exchanged zeolite Y is dehydrated by conventional methods (for example, by the procedures described in U.S. Patent 3,130,007) to remove intracrystalline water. The dehydrated zeolite is then treated with a solution of an alkali metal in liquid ammonia. This can be conveniently done by suspending the dehydrated zeolite in liquid ammonia and adding thereto a liquid ammonia solution of the alkali metal. The alkali metal, for example sodium or potassium, is used in an amount which provides a ratio of alkali metal to $Ni^{+2}$ ions of between about 1:4 and 1:1. The reduction reaction is carried out at temperatures between about −78° C. and −34° C., and the zeolite is allowed to remain in contact with the alkali metal-liquid ammonia solution for from 5 minutes to 2 hours. The reduced zeolite is separated from the alkali metal-liquid ammonia solution by filtration; any excess alkali metal is removed from the zeolite by washing with liquid ammonia; and residual adsorbed ammonia (if any) is removed by pumping under high vacuum (about $10^{-3}$ mm. Hg).

Alkaline earth metals, particularly calcium, and rare earth metals which are soluble in liquid ammonia can be used in place of the alkali metals as reducing metals (in liquid ammonia) in producing the compositions of this invention. The composition of this invention then contains alkaline earth metal cations and/or rare earth metal cations in addition to $Ni^{+1}$ ions.

In another, and preferred method of reduction, the (dehydrated) derivative of crystalline zeolite Y containing $Ni^{+2}$ cations is contacted with alkali metal vapor at temperatures between about 250° C. and the temperature at which the crystalline structure of the zeolite is destroyed. Temperatures in the range of 500° C. to 600° C. are generally preferred. This can be conveniently done by placing the zeolite to be reduced in the upper portion of a (vertical) quartz tube and placing the alkali metal in the lower portion of the tube. The zeolite and alkali metal can be separated, for example, by means of indentations in the tube or a glass wool barrier. The tube is then heated, producing alkali metal vapors which come in contact with the zeolite and effect reduction of $Ni^{+2}$ to $Ni^{+1}$. The amount of alkali metal is controlled to provide a ratio of alkali metal to $Ni^{+2}$ ions of between about 1:10 and 1:1. The time required for reduction of the $Ni^{+2}$ ions to $Ni^{+1}$ generally varies from a few minutes to about one hour.

The net result of the reduction of $Ni^{+2}$ ions is the replacement of each $Ni^{+2}$ ion by a $Ni^{+1}$ ion and one charge equivalent of reducing metal cation, for example, one alkali metal cation, one-half of an alkaline earth metal cation or one-third of a triply charged rare earth metal cation.

Complete exchange of $Ni^{+2}$ ions for sodium ions in zeolite Y results in a zeolite which contains only one-half the number of cations present prior to exchange. The complete reduction of such a completely $Ni^{+2}$ exchanged zeolite gives a zeolite of this invention which contains 50 percent $Ni^{+1}$ ions (based on $Na^{+1}$ in zeolite Y) and the balance cations derived from the reducing metal. Thus the compositions of this invention contain a maximum of 50 percent singly charged nickel cations, based on the number of sodium cations present in (unexchanged) zeolite Y.

The compositions of this invention need not contain sodium ions. For example, substantially all the sodium atoms in zeolite Y can be replaced by $Ni^{+2}$ ions and the latter reduced by cesium vapor to give a composition of this invention containing only the cations $Cs^{+1}$, $Ni^{+1}$ and perhaps trace amounts of $Na^{+1}$. However, the one tenth of one percent or more of singly charged nickel ions in the compositions of this invention is calculated using the number of sodium ions in zeolite Y as a basis.

Where an incomplete reduction of $Ni^{+2}$ to $Ni^{+1}$ is carried out, as where an alkali metal is used in less than a 1:1 ratio based on $Ni^{+2}$, the zeolite composition of this invention also contains $Ni^{+2}$ cations. Also, particularly where a reducing alkali metal is used in a 1:1 ratio based on $Ni^{+2}$, some of the $Ni^{+2}$ ions may be completely reduced to nickel metal. Some alkali metal may also be deposited within the zeolite structure, particularly where an excess of alkali metal is used in the reduction of the $Ni^{+2}$ ions.

The structure of the compositions of this invention has been confirmed by elemental analysis, X-ray diffraction analysis, analysis of the visible spectrum using a spectrophotometer equipped with integrating spheres for the light beam reflected from powdered samples, and by electron spin resonance (ESR) analysis.

The ESR analysis of compositions of this invention has shown that singly charged nickel cations can occupy both classes of cation sites available in zeolite Y. (For a discussion of the so-called Type I sites and Type II sites, see Pickert et al., Proceedings of the Third International Congress of Catalysis, Amsterdam, 1964.) The ESR signal of the $Ni^{+1}$ ions located at the hidden (Type I) sites and at the surface (Type II) sites appears at a $g$ tensor of $2.094 \pm 0.005$ and $2.06 \pm 0.005$, respectively. The $Ni^{+1}$ located at the surface sites is thermally stable in vacuum at temperatures up to about 100° C., while $Ni^{+1}$ located at the hidden sites is thermally stable in vacuum at 460° C. and above.

Structural studies show that in exchanged forms of zeolite Y divalent cations such as $Ni^{+2}$ prefer the hidden sites to the surface sites (See Pickert et al., op. cit.). Therefore, when the compositions of this invention are prepared from $Ni^{+2}$ exchanged zeolite Y containing relatively small amounts of $Ni^{+2}$, the $Ni^{+1}$ ions will be found primarily at the hidden sites; while in compositions of this invention prepared from $Ni^{+2}$ exchanged zeolite Y containing relatively large amounts of $Ni^{+2}$, the $Ni^{+1}$ ions are found in both the hidden and surface sites.

The compositions of this invention should be stored under vacuum or in an atmosphere of inert gas such as nitrogen, helium or argon, since the derivatives of zeolite Y which contain $Ni^{+1}$ react with water with irreversible loss of the ESR signal due to $Ni^{+1}$. The reaction with water is relatively fast at low temperatures (room temperature) and relatively slow at elevated temperatures (500° C. or above).

Derivatives of crystalline zeolite X (described and claimed in U.S. 2,882,244) in which at least one tenth of one percent of the zeolitic cations (based on sodium zeolite X) are singly charged nickel cations are compositions of this invention, and can be produced by the methods described hereinabove.

The compositions of this invention are useful in purifying inert gases, such as nitrogen, argon, helium and the like, which are contaminated with oxygen. The gas to be purified is passed through a bed or column of a zeolite composition of this invention and the oxygen contaminant is selectively and substantially completely adsorbed by the zeolite. The compositions of this invention can be used in a similar manner to selectively adsorb carbon monoxide from gas mixtures.

The following examples further illustrate the present invention.

Example 1

Approximately 5 g. of (sodium) zeolite Y, in which 5% of the original Na ions were replaced by cation exchange technique by $Ni^{+2}$ ions, was activated (dehydrated) in vacuum at 585° C. for one hour; after activation the zeolite was placed in a quartz tube in a dry box filled with argon. Below the zeolite sample, an excess amount of sodium metal was introduced which was separated from the zeolite sample by glass wool. Then the section of the tube containing the zeolite and the sodium metal was heated to 585° C. in vacuum for one hour. During this treatment by sodium vapor, the original light pink zeolite turned light green. The product showed a newly developed electron spin resonance signal (ESR) with a $g$ tensor of $2.094 \pm 0.005$, indicating that the $Ni^{+1}$ ions occupied primarily the hidden cation positions.

A 2.73 g. sample of the sodium treated product was leached in a sealed tube by strong acid, after which treatment a total of 32.5 standard $cm.^3$ of hydrogen was collected from the tube. This is equivalent to a Na/Ni ratio of 11.15. Much of the sodium was present as the (unoxidized) metal.

The treated sample upon exposure to oxygen lost its green color as well as the specific ESR signal, while a new signal of the same magnitude (due to the oxygen molecule ion $O_2^-$) developed. When this sample was heated to 460° C. in vacuum, its light green color reappeared, the ESR signal due to the $O_2^-$ disappeared and the original signal due to the $Ni^{+1}$ ion reappeared.

Example 2

Approximately 5 g. of (sodium) zeolite Y, in which 25% of the original Na ions were replaced by $Ni^{+2}$ using cation exchange technique, were activated (dehydrated) and treated with Na vapor using the conditions described in Example 1 with the exception that smaller quantities of sodium were used. During this treatment the product turned from pink to green, and a newly developed ESR signal due to $Ni^{+1}$ ions was observed on the material.

The treated sample upon exposure to oxygen lost its green color as well as the specific ESR signal while a new signal of the same magnitude (due to the oxygen molecular ion $O_2^-$) developed.

Example 3

Two samples, each weighing 2 g., of (sodium) zeolite Y in which 75% of the sodium was replaced by $Ni^{+2}$ ions were dehydrated as described in Example 1 and were then exposed to the vapors of Na and Cs metals, respectively, as described in Example 1. During this treatment, both samples treated with Na or Cs turned from strong pink to strong green color, and both developed large ESR signals with a $g$ tensor of $2.06 \pm 0.005$, showing that the $Ni^{+1}$ ions occupied surface cation positions in addition to the hidden cation positions.

The treated samples upon exposure to oxygen lost their green color as well as the specific ESR signal, while a new signal of the same magnitude (due to the oxygen molecular ion $O_2^-$) developed. On leaching with acid, the samples reduced by sodium and cesium evolved, respectively, hydrogen equivalent to a Na/Ni ratio of 0.12 and a Cs/Ni ratio of 0.14.

Example 4

A batch of (undehydrated) $Ni^{+2}$ exchanged (sodium) zeolite Y was prepared which contained 6.45% $Ni^{+2}$ based on the weight of the zeolite prior to dehydration. A 223 gram sample of this zeolite was dehydrated by heating under reduced pressure at 450° C. for 6 hours (weight loss 15.6%).

The dehydrated zeolite containing $Ni^{+2}$ was transferred under nitrogen to a 2.5 liter glass vessel. The bottom of the vessel was provided with a fritted glass disc to serve as a filter for removing liquid from the vessel. The vessel and zeolite were cooled to $-78°$ C., 0.5 liter of liquid ammonia was condensed into the vessel, and the ammonia was filtered off to remove any residual water. An additional 1.5 liters of liquid ammonia was condensed into the vessel, and as the zeolite-ammonia mixture was vigorously stirred, 9.86 grams of calcium metal was added in small pieces over a 6 hour period. The liquid ammonia was filtered off, and the reduced zeolite was washed with an additional 0.5 liter of liquid ammonia.

The reduced zeolite (a pale yellow powder) was heated to 60° C. under reduced pressure to remove residual ammonia, and was identified as a composition of this invention containing $Ni^{+1}$ cations.

Example 5

Following the procedures of Example 4, a 15.7 gram sample of the (undehydrated) $Ni^{+2}$ exchanged zeolite used in Example 4 was dehydrated and suspended in 50 ml. of liquid ammonia at $-60°$ C. A solution of 675 mg. of potassium metal in about 100 ml. of liquid ammonia was then added, and the resulting reaction mixture was maintained at $-60°$ C. for one hour. The ammonia was filtered off and the reduced zeolite was washed twice with 50 ml. portions of liquid ammonia. Residual ammonia was removed by heating under reduced pressure at 60° C., and the product was identified as a composition of this invention containing $Ni^{+1}$ cations.

What is claimed is:

1. A crystalline alumino-silicate zeolite of the molecular sieve type which comprises a derivative of crystalline zeolite Y and in which at least one tenth of one percent of the zeolitic cations, based on the sodium cations in zeolite Y, are singly charged nickel cations.

2. Process which comprises contacting (a) an alumino-silicate zeolite of the molecular sieve type which consists essentially of zeolite Y wherein at least about two tenths of one percent of the cations are doubly charged nickel cations, with either (b) an alkali metal, an alkaline earth metal, or a rare earth metal dissolved in liquid ammonia, or (c) the vapors of an alkali metal, at a temperature and for a period of time sufficient to reduce sufficient doubly charged nickel cations to produce a zeolite Y wherein at least one tenth of one percent of the cations are singly charged nickel cations, wherein the proportion of reactant (b) or (c) is such as to provide not more than one charge equivalent of reducing metal cation per cation of doubly charged nickel.

References Cited

UNITED STATES PATENTS

| | | | |
|---|---|---|---|
| 3,013,982 | 12/1961 | Breck et al. | 252—455 |
| 3,013,986 | 12/1961 | Castor | 252—455 |
| 3,185,540 | 5/1965 | Breck et al. | 23—2 |
| 3,331,190 | 7/1967 | Glew et al. | 55—75 X |

OTHER REFERENCES

Handbook of Chemistry and Physics, The Chemical Rubber Co., Cleveland, Ohio, 44114, forty-sixth edition 1964, 1965, p. B–123 (Copy in Group 117).

DANIEL F. WYMAN, *Primary Examiner.*

C. F. DEES, *Assistant Examiner.*

U.S. Cl. X.R.

23—113; 252—459